Patented Apr. 13, 1926.

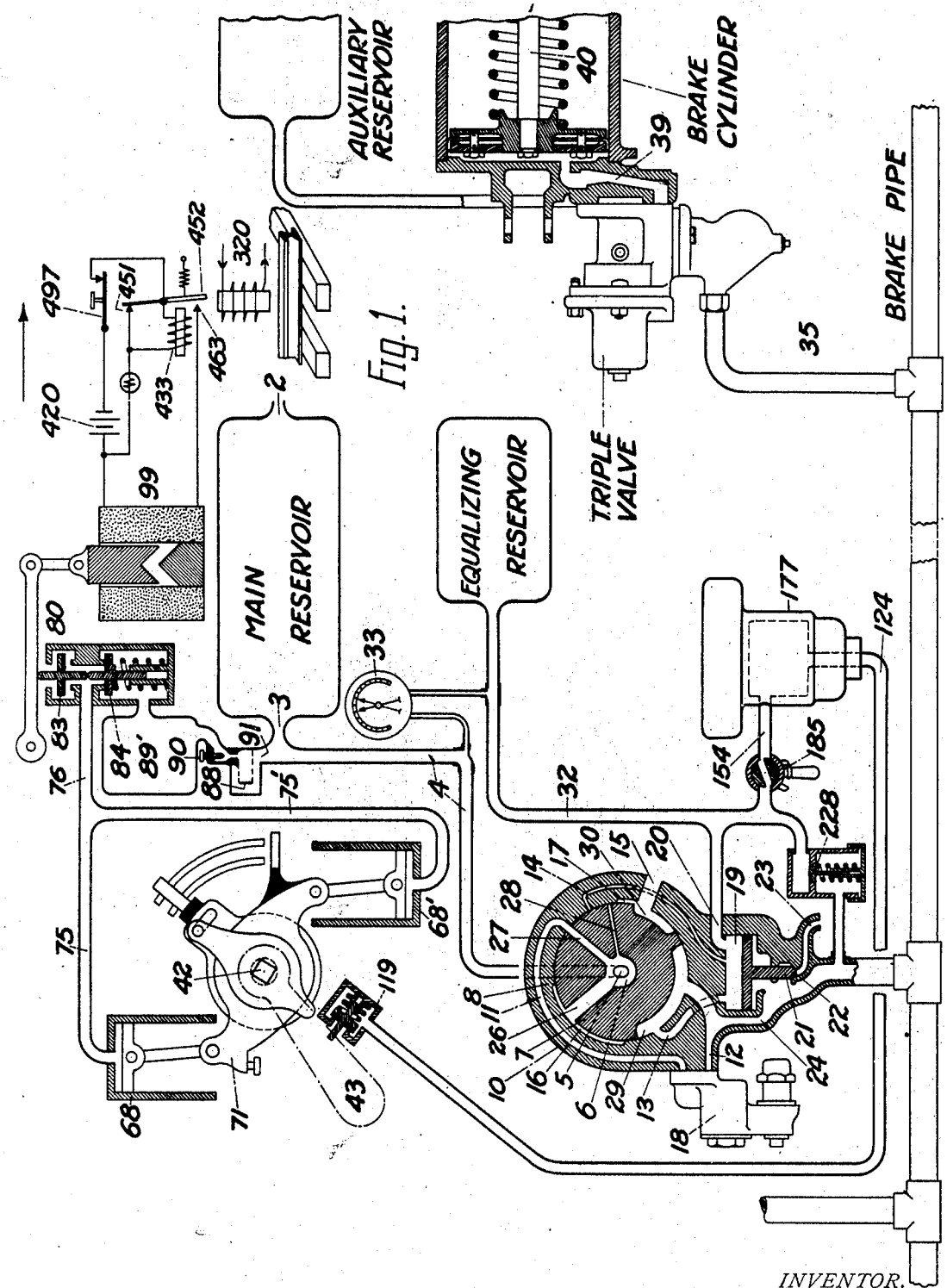

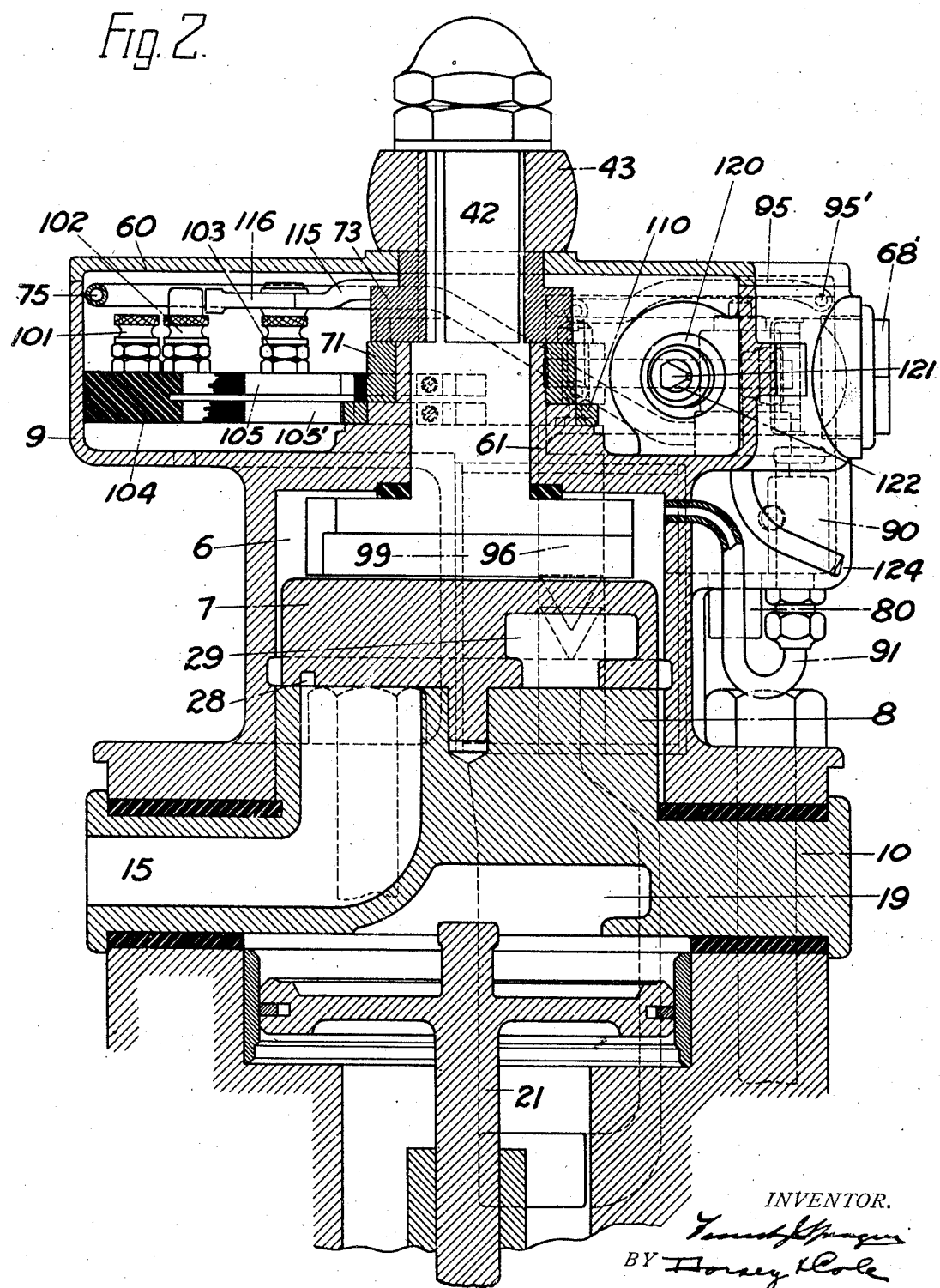

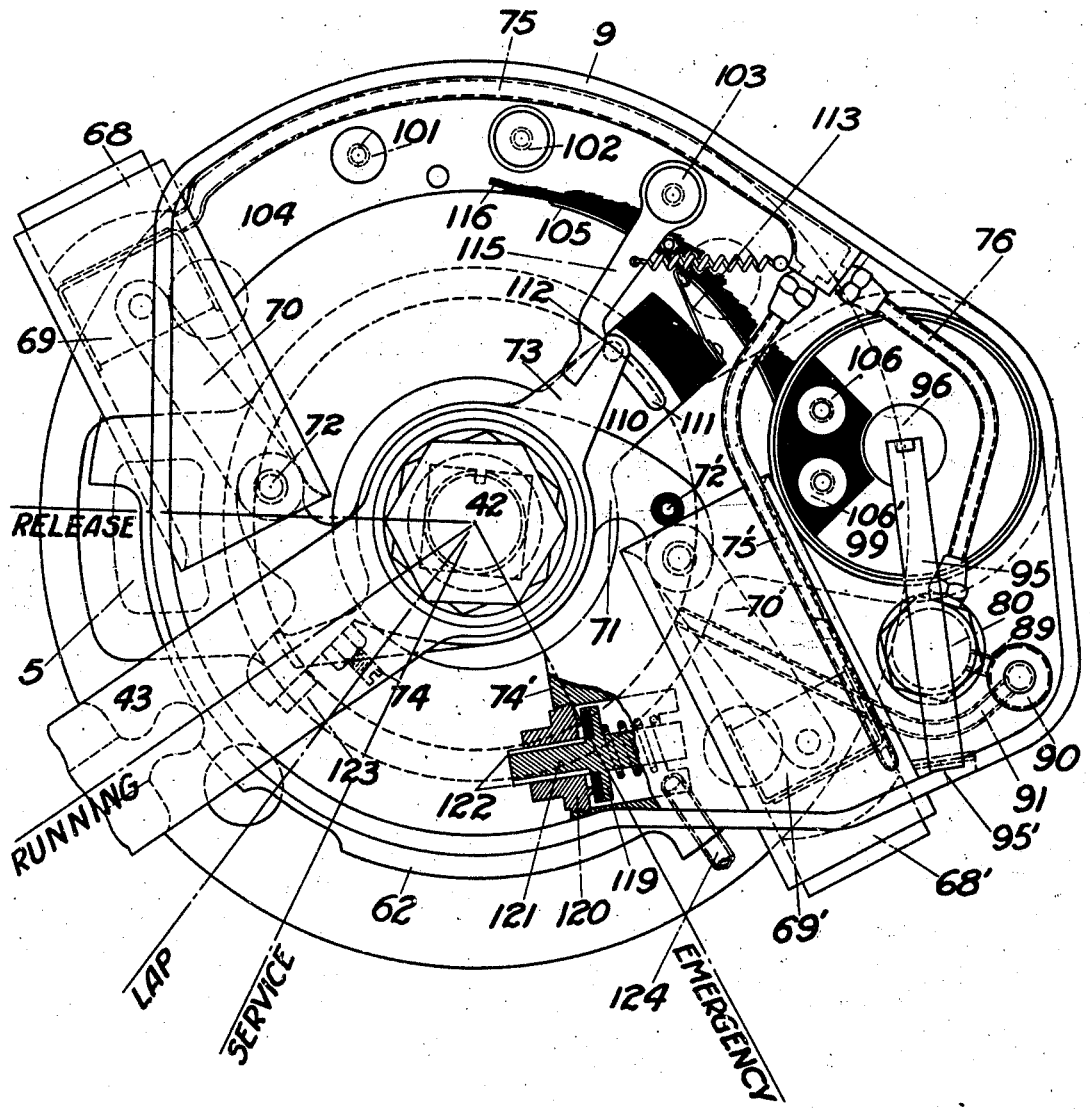

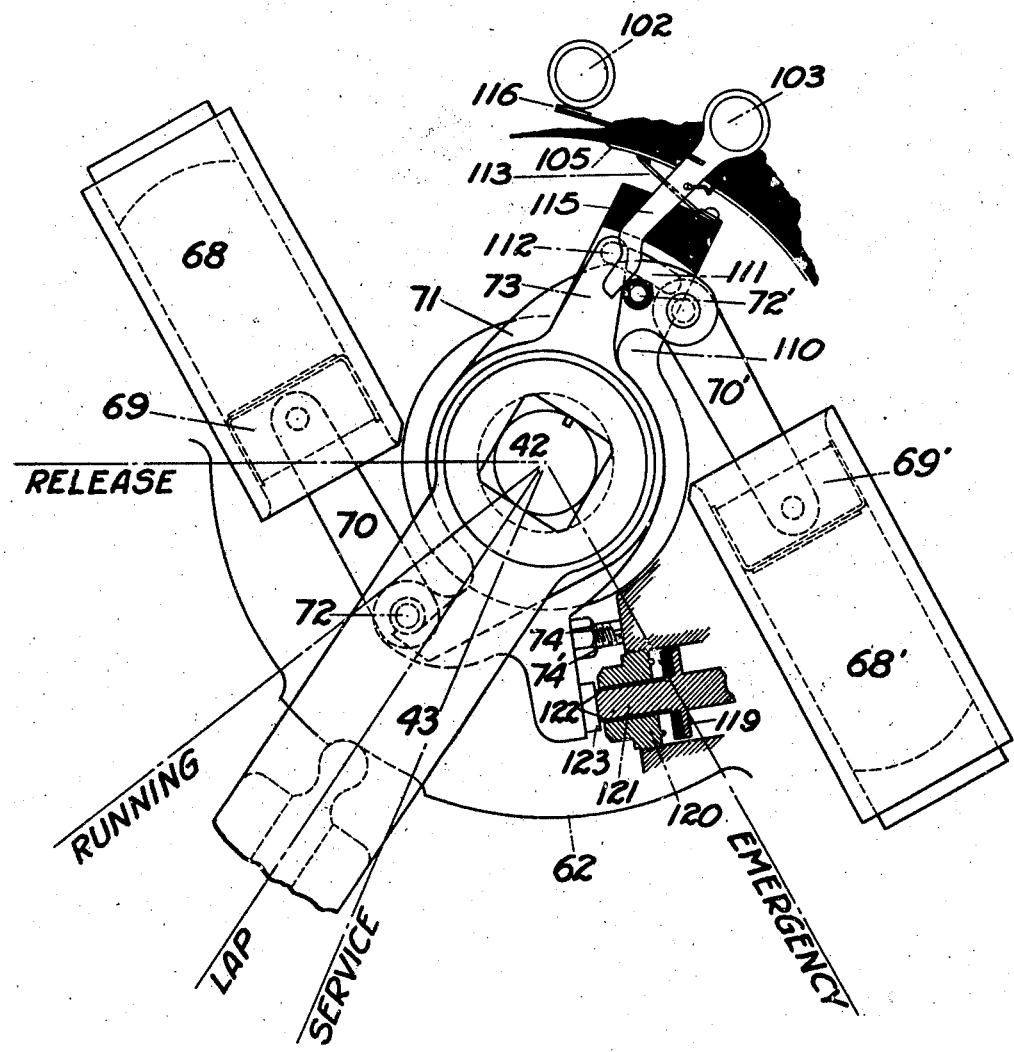

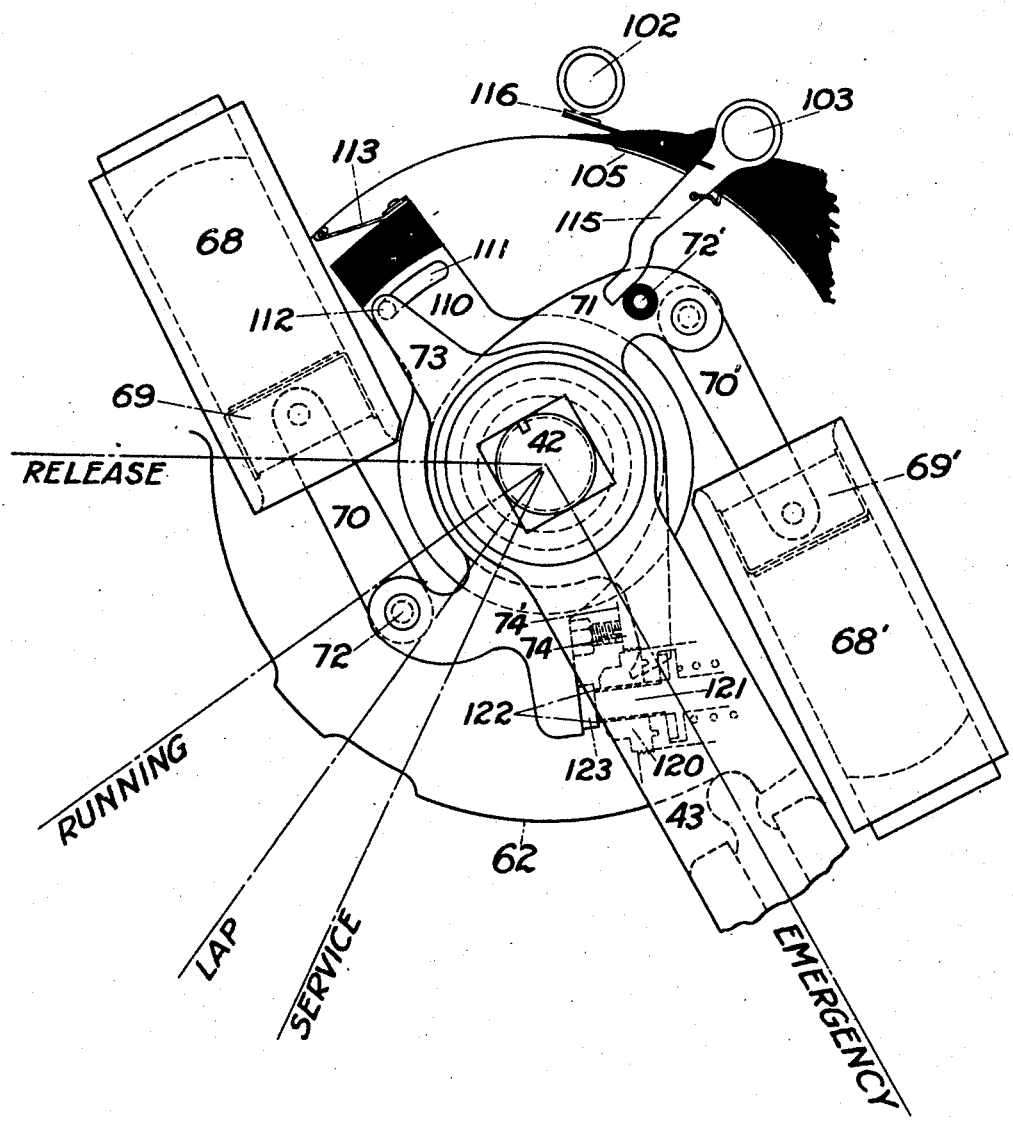

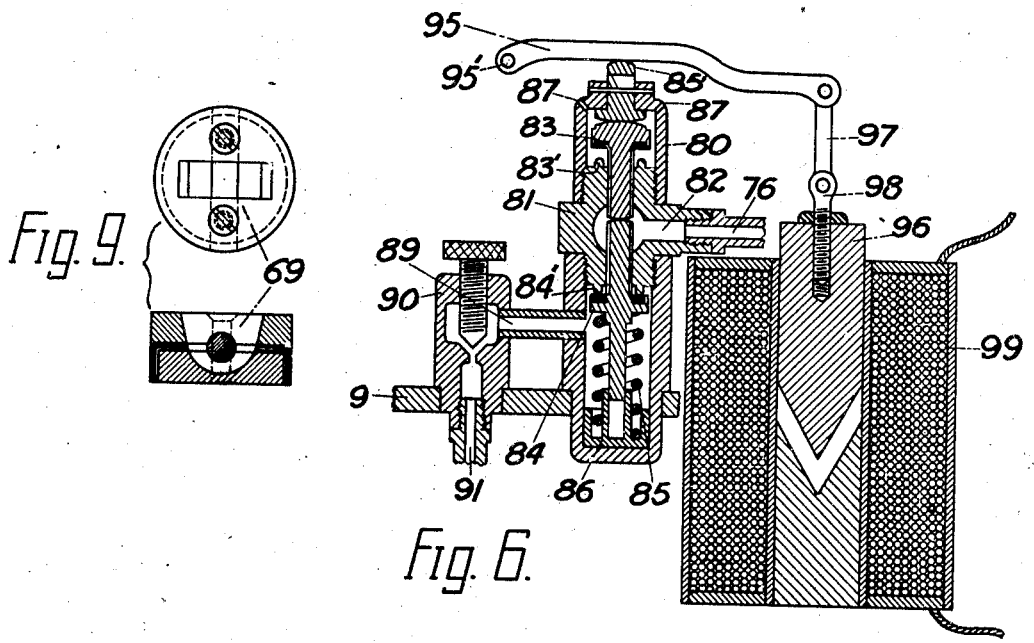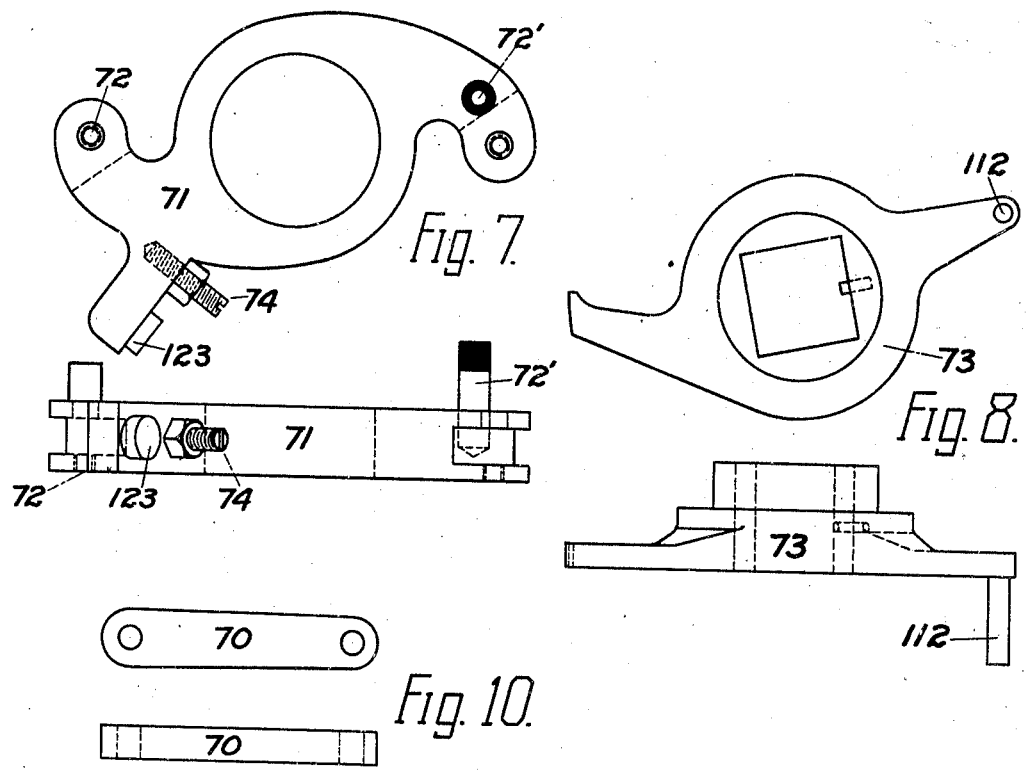

1,581,094

UNITED STATES PATENT OFFICE.

FRANK J. SPRAGUE, OF NEW YORK, N. Y., ASSIGNOR TO SPRAGUE SAFETY CONTROL AND SIGNAL CORPORATION, A CORPORATION OF VIRGINIA.

TRAIN-CONTROL APPARATUS.

Original application filed December 31, 1914, Serial No. 879,939. Divided and this application filed September 30, 1925. Serial No. 59,564.

*To all whom it may concern:*

Be it known that I, FRANK J. SPRAGUE, a citizen of the United States, residing at New York, in the county of New York and State of New York, have invented certain new and useful Improvements in Train-Control Apparatus, of which the following is a specification.

This application is filed as a divisional of my prior application filed December 31st, 1914, Ser. No. 879,939, for method of and apparatus for control of train movement, and the subject-matter hereof forms a part of the apparatus disclosed in the aforesaid prior application.

The purpose of my present invention is to provide suitable automatic and track-actuated devices associated and cooperating with standard braking equipment, for example the Westinghouse valve, by means of which the brake pipe of the braking system may be automatically vented without interference with further and additional venting thereof through the usual manual means.

Other objects of my invention will appear from the following specification and claims.

The automatic air brake system upon which my invention is herein shown as superimposed, is the ordinary form embracing what is known as the Westinghouse G6 engineer's valve, this valve being chosen for simplicity of illustration and without intended limitation. It comprises the following elements:

(a) One or more main reservoirs of large capacity carried on the locomotive, in which is normally maintained a volume of air under high pressure, varying on different equipments from 90 to 130 pounds, which air is supplied by an automatically controlled steam or electric pump.

(b) A pipe system consisting of air pipes individual to each car, joined continuously from car to car by detachable flexible hose couplings, this system being supplied with pressure air from the main reservoir through a feed valve by which the air therein is normally maintained at a fixed pressure usually 10 or more pounds less than that of the main reservoir.

(c) The engineer's valve, with its equalizing chamber and reservoir, is connected to the air supply and the brake pipe system, and controls the latter, its function depending upon the position of the handle of the valve. The rotary element of the G6 valve normally has five positions, namely: "running" when air from the main reservoir is permitted to feed through the automatic feed valve into the brake pipe to make up any loss, and to maintain therein a fairly constant pressure; "release" when air from the main reservoir is permitted to flow directly through the brake pipe system to charge it after it has been exhausted; "lap", which, with the two remaining positions, is oppositely disposed from the "release" position, when all ports in the rotary valve are blanketed, there being no feeding of air from the main reservoir into the brake pipe and no escape of air from the equalizing reservoir; "service", when the air supplied from the main reservoir through the feed valve is blanketed from the brake pipe, and air from the latter is permitted to escape into free air through a port controlled by an equalizing piston which is indirectly controlled by the rotary element of the valve through differential air pressures; and finally, "emergency" position in which the air from the main reservoir through the feed valve is blanketed from the brake pipe, but the air in the latter is allowed free escape into atmosphere.

(d) The brake cylinders, in which move against spring resistance the pistons and rods connected with the foundation gear of the brake rigging, to force the brake shoes against the car wheels with a varying pressure, depending upon the handling of the engineer's valve.

(e) Auxiliary reservoirs individual to each car, normally charged with air at the same pressure of the brake pipe and through the triple valves supplying air directly to the brake cylinders when required.

(f) Plain or quick-action triple valves individual to each car, these forming the connecting links between the brake pipes, auxiliary reservoirs, brake cylinders and free atmosphere. The construction and functions of these valves are well known to those versed in the art.

(g) Duplex indicating air gauge, one indicator being connected with and showing the air pressure in the main reservoir, and the other connected with and showing the air pressure in the equalizing reservoir, as well, normally, as that in the brake pipe, the latter lagging slightly during reduction.

Various modifications of the above outlined air braking are extant including among others the adjunct of straight air braking and independent locomotive braking with slight changes in the system to meet these adjuncts; also operation of the brake system by electrical control; but for the purpose of this application it is not necessary to describe these in detail although my system is applicable to practically all of them.

All of the operations of braking, whether the making of small or large service applications of air or full emergency applications, are effected by variations of air pressure in the brake pipe, in variable times and amounts depending upon the character of braking, and the release is effected by recharging the brake pipe and bringing its pressure back to normal.

All normal braking is initiated and controlled by the engineer through the engineer's valve, and such normal braking provides when brakes are applied, first, for cutting off connection between the main reservoir and the brake pipe system; second, service application of the brakes, controlled as to rate of application and amount of air reduction in the brake pipe, the time being perhaps half a minute and the reduction anywhere from 3 or 4 to 20 or 25 pounds; and third, emergency application by free exhaust from the brake pipe to atmosphere, the time occupied being but a few seconds, and the resultant more violent braking being the maximum possible under the existing conditions of air pressure in the brake pipe.

In service applications on modern systems the engineer does not directly open an exhaust from the brake pipe to atmosphere, but he makes a more or less limited or restricted opening from an equalizing chamber in the bottom of his valve, which is connected with the equalizing reservoir to get a volume of air to handle, and thereby refinement in making air reductions; this reduction of air in the equalizing chamber in turn lifts an equalizing piston by differential air pressure, which when lifted opens the brake pipe to atmosphere through the service port, and when, following the closure of the service controlling port in the engineer's rotary valve, the air on the upper and lower sides of the equalizing piston controlling the service port is equalized in pressure, the brake pipe opening is automatically closed.

In making an emergency application, however, the engineer's valve provides for a direct exit from the brake pipe through a different and larger port, and the reduction of air pressure in the brake pipe is very sudden. It acts first on the nearest car, and then, because not only of the air reduction due to the escape of air through the engineer's valve, but likewise because of the emptying of part of the air of the brake pipe into the brake cylinder through the triple valve when suddenly operated under emergency conditions, there is effected a very quick reduction of air pressure in the second car, and so on in each car of the train in rapid sequence, the application of the brakes under emergency application taking place, not simultaneously (except where electric control is introduced) but in very rapid succession, 40 or 50 cars having emergency brakes applied in a very few seconds.

The construction and operation of the automatic air brake system will be more fully gone into in connection with the drawings.

In carrying out my invention I have provided an engineer's automatic valve head which replaces the upper valve body of the usual engineer's valve, being interchangeable upon the lower valve body, and it is the only part of the existing air brake system that is physically altered by the installation of the safety control equipment.

Its mechanism is brought into play through suitable agencies operated when danger conditions exist through instrumentalities on the track and on the train. It does not interfere with any of the present movements or functions of the engineer's brake valve, so far as manual operation is concerned. Up to the time an automatic application is initiated, and even then, it does not interfere with the manual application of the brakes, though as hereafter pointed out, it tends for a period to oppose the release of the brakes when automatically applied.

The automatic valve head is pneumatically operated but under electric control, for the purpose of placing the engineer's valve handle and rotary valve in a non-changing position, preferably lap position immediatly prior to the automatic venting of the brake pipe, to avoid other than manual releasing of the brakes; and, in one form, through the movement of its motor or driving yoke, it opens an outlet or pilot valve to free atmosphere.

After the engineer's valve handle and rotary valve have been automatically placed in lap position, they are so retained by pneumatic pressure for a period of time coincident with the energization of a controlling magnet, after which the pneumatic pressure is again released. However, regardless of whether the pneumatic pressure is applied to or released from the brake valve handle and rotary valve, the latter can only be returned to release position by manual operation.

Referring to the accompanying drawings in which corresponding parts are designated by corresponding marks of reference:—

Figure 1 is a diagrammatic view of an apparatus embodying my invention, forming the subject-matter of this divisional application.

Fig. 2 is a central vertical section of a standard type of engineer's valve, having mounted thereon in lieu of the standard head my electrically and pneumatically operated brake head.

Fig. 3 is a plan view of the structure shown in Fig. 2 with the cover removed, the valve itself being in running position (having been moved to that position from release) and its pneumatic actuator being inert.

Figs. 4 and 5 are fragmental but corresponding views, the valve in Fig. 4 being now in lap position and its pneumatic actuator energized, while in Fig. 5 the valve has been manually thereafter placed in emergency position.

Fig. 6 is a section through the controlling valve and the pneumatic actuator of the engineer's valve.

Fig. 7 is a plan and elevation of the driving yoke for the engineer's valve.

Fig. 8 is a plan and elevation of the driven yoke.

Fig. 9 is a plan and elevation of one of the pistons of the actuator of the engineer's valve.

Fig. 10 is a plan and elevation of all of the connecting rods.

The automatic brake system with my additions is illustrated in Figure 1. The main reservoir has a pipe connection 2 through which air is delivered into it and compressed therein by an automatically controlled pressure pump, not shown. On the opposite side of the main reservoir is a pipe connection 3, which leads from the main reservoir into pipe 4, which communicates with the passageway 5 in the engineer's brake valve leading to chamber 6 in the top thereof (see Fig. 2). The actual construction of a portion of the standard G6 engineer's brake valve, together with my additions thereto, is illustrated in Fig. 2, wherein the rotary valve 7 rests on its seat 8. The casing 9 enclosing the rotary valve and its seat are of a standard construction in respect to passageway 5 and chamber 6.

Considering now Fig. 1, the chamber 6 is shown diagrammatically in the center of the rotary valve 7 and the valve seat 8 is shown surrounding the periphery of the rotary element in place of beneath it, the rotary element itself being shown with radiating passages and peripheral cavities in place of the more or less vertical corresponding elements in the physical construction shown in Fig. 2. The valve body 10 (Figure 1) of the engineer's brake valve contains passageways 11, 12, 13 and 14, and an emergency exhaust port 15, all communicating directly with the seat for the rotary valve 7. In this seat is also chamber 16, which has no communication with the atmosphere except through the rotary valve, and a chamber 17, which is in communication with the atmosphere through the emergency exhaust port 15. The passageways 11 and 12 lead respectively to and from a feed valve 18. In the bottom of the engineer's valve is an equalizing piston chamber 19. Passageways 13 and 14 lead to and from this chamber respectively at the top thereof. This chamber also at its top is provided with a port 20, and the bounding walls of the chamber constitute a cylinder within which reciprocates an equalizing piston 21. The equalizing piston carries a service exhaust valve 22 which opens and closes a service exhaust port 23, leading to atmosphere on the one side, and communicating with a passageway 24 leading to the underside of the equalizing piston 21 and connecting also with the passageway 12 to the valve and to the brake pipe.

Still considering Figure 1, the rotary valve 7 has three passageways 26, 27 and 28 radiating from chamber 6 and two cavities 29 and 30 on its periphery. Port 20 is the port by which communication is made between the equalizing piston chamber 19 and the equalizing reservoir by means of a pipe 32. The brake pipe is connected with a triple valve by means of a pipe connection 35, and the triple valve is in turn connected with an auxiliary reservoir and a brake cylinder by means of port 39. The triple valve is the connecting link between the brake pipe, the auxiliary reservoir, the brake cylinder and free atmosphere. Its general construction and operation are well known to those versed in the science of braking, and hence no detailed description of its operation is given here.

The spring retracted piston of a brake cylinder is shown at 40, this being the piston which forces the brake shoes against the car wheels, through the foundation gear of the brake rigging, not shown. The duplex gauge 33 above referred to is suitably connected with the main reservoir through a branch from pipe 4 and with the equalizing reservoir through a branch from pipe 32.

The rotary valve 7 is manipulated by means of a spindle 42 (see Figs. 2 and 3), and while this is shown as adapted for use in my invention, it is practically identical with the spindle of the ordinary automatic brake system. The engineer's handle 43 attached to the top of the spindle is the same as that used in the ordinary automatic brake system.

Considering the ordinary practice and operation recited above with reference more specifically to Figure 1, the five positions of the G6 engineer's brake valve—running, lap, service, emergency and release—are indicated as follows:

*Running position.*—In Figure 1 the rotary valve 7 is shown diagrammatically in running position. The passageway 26 of the rotary element registers with the blind chamber 16 and is blanketed. The passageway 28 is also blanketed; but the passageway 27 registers with the passageway 11 in the valve body, and thus permits the flow of air from the main reservoir into the feed valve 18, and thence into the brake pipe through the passageways 12 and 24. The passageway 12 is in communication with passageway 13 through the cavity 29, thus permitting air from the feed valve to flow into the equalizing piston chamber 19 and thence into the equalizing reservoir. Passageway 14 and the emergency port 15 are both blanketed. The same pressure is then maintained in the equalizing piston chamber and the equalizing reservoir as in the brake pipe and beneath the equalizing piston 21, and the service exhaust valve 22 is maintained in its downward position, closing the service port 23. No air escapes from the brake pipe and the brakes are free.

*Lap position.*—When the brake handle is in the lap position (indicated in Fig. 4), the passageway 26 of the rotary valve registers only with the blind chamber 16 and is blanketed; the passageways 27 and 28 are both blanketed. The passageways 11, 13 and 14, and the emergency exhaust port 15 are also blanketed. There is, therefore, no flow of air from the main reservoir into the brake pipe, or the equalizing piston chamber either directly or through the feed valve, and no flow of air from the equalizing piston chamber. On coming to lap position from service position the service exhaust valve 22, on equalization of pressure due to the drop of pressure in the brake pipe, is moved downward from the position it has at the commencement of the lap position of the engineer's valve by its weight and a slight excess of total pressure of air above the equalizing piston, closing the service exhaust port 23 and after closing, it remains closed as long as lap position is maintained; in coming to lap position from running position the service port 23 is already closed.

*Service position.*—When the brake handle is in the service position, indicated by dotted lines in Figs. 3, 4 and 5, the rotary valve has rotated further counter-clockwise until the passageway 14 registers with the cavity 30. The passageway 26 registers with the blind cavity 16 and is still blanketed. The passageways 27 and 28 also remain blanketed. As in lap position, the main reservoir is thus cut off from the feed valve, brake pipe, equalizing piston chamber 19 and the equalizing reservoir. The passageway 13 is also blanketed, and since the cavity 30 registers both with passageway 14 and the emergency port 15, the equalizing piston chamber and the equalizing reservoir are open to atmosphere. Service position is normally reached from or through lap position, i. e., a position in which the service exhaust port 23 is closed.

When the engineer makes a service application he reduces the pressure in the equalizing reservoir and the equalizing piston chamber by the number of pounds which he wishes to reduce in the brake pipe, which reduction of pressure will be indicated by one of the hands of the duplex air gauge 33, that hand being black in ordinary practice. As the pressure is reduced in the equalizing piston chamber, the air pressure in the brake pipe, acting on the underside of the equalizing piston raises it, together with the service exhaust valve 22, and opens the service exhaust port 23 to atmosphere, allowing the air to escape therethrough from the brake pipe. The rapidity with which the equalizing piston is thus raised depends upon the rapidity with which the differential between the pressure on top of the equalizing piston and on the bottom of the equalizing piston is made. So long as the equalizing reservoir and the equalizing piston chamber are open to atmosphere by the rotary valve being maintained in service position, the service exhaust port 23 will be held open, provided there is sufficient pressure in the brake pipe to maintain the equalizing piston in its upward position. The resulting drop of pressure in the brake pipe effects a movement of the triple valve to close the opening of the brake cylinder to atmosphere and places the brake cylinder into connection with the auxiliary reservoir so that pressure air therefrom enters the brake cylinder and moves its piston to apply the brakes with increasing pressure. This may continue until what is called the point of equalization is reached, that is, when the air in the brake cylinder and in the auxiliary reservoir is at the same pressure. In ordinary operation, however, the desired service braking is effected before the point of equalization is reached. When the reduction desired in brake pipe pressure has been indicated by the gauge connected with the equalizing piston chamber and the equalizing reservoir, the engineer normally moves his handle into lap position. This movement blankets the ports as heretofore described and the venting of air from the equalizing piston chamber is discontinued and, when the air in the brake pipe is reduced to the pressure or slightly below the pressure in the equalizing piston chamber, the piston moves downwardly and closes the exhaust port 23. Thus the movement from service position to lap position discontinues the bleeding of the equalizing piston chamber air and places a limit upon the reduction of air in the brake pipe.

While in lap position after having made a service application, there being no port open by which air can enter or leave the brake pipe, the brakes will normally remain applied under this pressure until they have been released either by leakage, or by moving the rotary valve ordinarily into release (or possibly running) position, or until additional pressure has been applied to them by again moving the rotary valve to service or emergency position.

*Emergency position.*—The emergency position of the engineer's valve handle is illustrated in Fig. 5. This is the extreme braking position of the valve, and it is only possible to come to it from or through service position by moving the rotary valve counter-clockwise from the latter. This leaves the ports in the rotary valve still blanketed, although in a slightly different position, so that there is still no flow of pressure air into the brake pipe and the main reservoir is not bled. The emergency exhaust port 15 is connected through the cavity 29 with the passageway 12 so that a free passage is open from the brake pipe to atmosphere. The exhaust port 15 is also connected by the chamber 17 and the cavity 30 with the passageways 14 and 11. This results in relieving the pressure on the top of the equalizing piston and prevents a possible jamming of the service exhaust valve. If at the time a service application has been effected the rotary valve is moved to emergency position increased braking may be thereby caused.

*Release position.*—The release position of the engineer's valve handle is indicated by dotted lines in Figs. 3, 4 and 5. After the brakes have been applied it is only possible to come to release position from or through running position, by moving the rotary valve clockwise until passageway 11 is blanketed and air from the main reservoir is prevented from flowing into the feed valve; passageway 26 and cavity 29 both register with chamber 16, cavity 29 also registers with passageways 13 and 12, and passageway 27 registers with passageway 14. Air thus flows freely from the main reservoir through passageways 13 and 14 to the equalizing piston chamber 19 and thence to the equalizing reservoir; and through passageways 12 and 24 into the brake pipe, recharging both the equalizing reservoir and the brake pipe, releasing the brakes in the well known manner.

Release and running positions may be regarded as the charging positions, in that in both of them the main reservoir is either directly or indirectly through the feed valve, in communication with the brake pipe and a transfer of air takes place from the former to the latter to create or maintain therein the proper pressure. In a like manner, service and emergency positions are both braking positions, in that they cause a reduction of brake pipe pressure, and together with lap position may be termed "non-charging" positions, in that in each of these positions communication between the main reservoir, and the brake pipe, the equalizing piston chamber, and equalizing reservoir is cut off.

The construction, function and operation of the triple valves in controlling the application and release of the brakes and of the feed valves in maintaining the differential of pressure between the main reservoir and brake pipe system are in no way changed or effected by the application of my invention; and the function and operation of the engineer's brake valve in manually applying and releasing the brakes when no automatic action occurs are likewise in no way changed or effected by the application of my invention; and the details of these elements are not further illustrated or described herein, as their action is well known.

I have illustrated my invention as superimposed upon the automatic air brake system just described, and as acting through that system in applying the brakes. As illustrated, the rotary valve casing 9, which is substituted for the upper valve body of the ordinary engineer's valve, contains means which normally operate on the spindle 42 to rotate the spindle and its attached rotary valve 7 to a non-charging position, preferably into lap position, this being supplemental to the engineer's handle. In Figures 1 to 5 this valve casing also contains means for effecting the initial outlet of air which effects a drop of pressure in the brake pipe by reducing the pressure in the equalizing reservoir and the equalizing piston chamber, to cause equalizing piston 21 to raise and open the service exhaust port 23.

For convenience reference is made to Patent No. 1,553,295, September 8, 1925, issued to me on a divisional application of the original application Ser. No. 879,939, for illustration of the lap, release, service and emergency positions of the G6 engineer's valve above referred to; also for a description of the construction and operation of the valve 228 which latter is not claimed herein.

The engineer's automatic valve head, while maintaining in all respects the normal function of the engineer's valve through the movement of the rotary valve therein by the engineer's handle to the various positions of release, running, lap, service and emergency, provides in addition for the automatic application of the brakes, through the usual service exhaust port 23, while at the same time leaving the engineer free to make further manual applications or under certain conditions to release his brakes.

The amount of reduction of brake pipe pressure caused by this automatic application may be limited by the manual clockwise movement of the engineer's valve handle. The part 177 shown in outline has to do with the invention described and claimed in my original application Ser. No. 879,939, above identified, and forms no part of the invention of this divisional application. It is not described or claimed herein and for the purposes hereof pipes 124 and 154 may be considered as in open communication with each other.

The engineer's automatic valve head is electrically controlled and mechanically as well as manually operated and maintains the rotary valve in a non-charging position, e. g., lap position, during the automatic application, so that no air escapes from the main reservoir and enters the brake system therefrom.

This device being interchangeable with the upper valve body of the ordinary engineer's valve is consequently located in the engineer's cab. While the normal function is as stated above, it in no way prevents the making of manual brake applications through the manual movement of the engineer's valve.

The construction of this valve head can conveniently be understood by referring to Figs. 2 to 10 in connection with Figure 1.

Casing 9 is a flanged cylindrical casting interchangeably bolted to the lower valve body 10 of the engineer's valve. It is partitioned horizontally, and the lower portion constitutes a cylindrical recess, forming the chamber 6 and constituting a cover for the rotary valve 7. The upper portion of the casing comprises an irregular recess with a detachable cover 60 which may be secured in place in any appropriate manner. The valve stem 42 of the rotary valve passes through the partition, which, at this point, is made in the form of and constitutes a bushing 61; thence through an aperture in the cover 60, above which the ordinary brake handle 43 is attached to the stem in the same manner as in the ordinary engineer's valve. The exterior of casing 9 is provided with a notched sector 62, which has the same relative position in respect to the rotary valve and brake handle as in the ordinary engineer's valve.

Cast integral with or fastened to the upper portion of the casing 9, are two motor cylinders 68 and 68', oppositely disposed but with axes parallel to each other. These cylinders are closed at the outer ends but opened at the inner ends, and within them reciprocate suitably packed trunk pistons 69 and 69' respectively, joined by connecting rods 70 and 70' to a driving yoke 71 which is rotatively mounted on bushing 61. Pins 72, 72' project upwardly from the driving yoke and engage the driven yoke 73, which is squared upon the rotary valve stem above the bushing 61 and rotates the valve stem and with it the engineer's brake handle and rotary valve counterclockwise when driven by the pins 72, 72'. The driving yoke 71 is provided with an adjustable stop 74, 74' adjusted so that the limit of counterclockwise motion of the driving yoke places the driven yoke in lap position (see Fig. 4), but because the driving yoke engages the driven yoke on one side only the rotary valve is free to be moved manually, through its spindle and the engineer's brake handle, to service or emergency position as may be desired. The motor cylinders and pistons are of such size that, while the rotary valve is moved to lap position and maintained there during automatic braking, it is not done so with such force as to make it impractical for the engineer to manually move the rotary valve (carrying with it the two yokes) to either release or running position should he so desire, so that the action of the motor cylinders is subordinated to this manual operation.

The motor cylinders are pneumatically connected behind their respective pistons by pipes 75 and 75' which connect through a three way coupling with a pipe 76 leading to a controlling valve 80, through which provision is made to connect the motor cylinders either with atmosphere direct through the upper part of the valve, or to pressure air through the lower part of the valve, supplied through a pipe 89, a throttling valve 90 and a pipe 91 leading from the throttling valve to the chamber 6, as is shown in Figs. 2 and 3. As shown in Figure 1 the pipe 91 is directly connected with the pipe 4, a strainer 88 is interimposed on one side of the throttle and a capacity chamber 89' on the other side. The construction of the controlling valve 80 is illustrated in Fig. 6. It consists of a double face section 81 with a connection 82 from its center to pipe 76. In this section are centered two suitably faced poppet valves 83 and 84 which are oppositely disposed, and whose valve stems, passing through guiding apertures in section 81, are in contact at their ends, which are oppositely rounded. The lower of these valves 84 is normally held against its valve seat 84' by spring 85, reinforced by air pressure when the system is charged, and hence is normally closed; and in this position it lifts the upper poppet valve 83 from its seat 83' and raises plunger 85'. The contacting faces of the upper valve 83 and its plunger are also oppositely rounded. Conversely, when the upper poppet valve 83 is pressed downward by the plunger 85' against its valve seat 83' and is closed, the lower poppet valve is forced downward into its guide 86 and is opened. Both valves are enclosed in housings, in the upper of which provision is made for exit to atmosphere through ports 87, 87, and with the lower of which the throttling valve 90 and any capacity pipe or chamber if needed, is conveniently connected, as by pipe 89. To permit free circulation of air when the valves are opened their stems are flattened on three sides, as indicated and the valves fit loosely in their respective housings.

The controlling valve, therefore, comprises in brief, two oppositely disposed poppet valves, arranged in tandem, one of which is normally opened and the other of which is normally closed. The rounded surface of the valve stems above mentioned eliminate possibly improper seating of the valve faces. The position of the valve shown in Fig. 6 is its running position, i. e., the valve is in readiness for operation to admit pressure air to the motor cylinders for an automatic application of the brakes. When at rest no air from the main reservoir passes through the valve to the motor cylinders 68, 68', but air from the motor cylinders is allowed free escape to atmosphere past poppet valve 83 through the ports 87, 87. When the automatic braking is initiated the poppet valves are moved from their upper or running position to their lower position, and the passageway from pipe 76 to atmosphere is then closed so that no air escapes from the motor cylinders, but air at main reservoir pressure is admitted to the motor cylinders through the open poppet valve 84.

The throttling valve 90, which is also illustrated in Fig. 6 as an adjustable needle valve, governs the rate of supply of pressure air from the chamber 6 to the controlling valve and thence to the motor cylinders. In Figure 1 the pipe 89 is illustrated as being enlarged, forming a capacity reservoir 89'. This capacity reservoir merely assures ample volume of air to act on the pistons 69 and 69' when the controlling valve 80 is thrown from normal to braking position, so as to promptly overcome the locking of the engineer's handle on the sector notches. It permits a more liberal opening of the throttle valve without the danger of throwing the rotary valve past lap position.

A strainer or dust separator 88 should be provided in the air line preceding the throttling valve 90. This is indicated diagrammatically in Figure 1.

An arm 95 lies over the plunger 85' of the controlling valve and has one end pivotally mounted at 95' to the casing 9, and its other end is pivotally and adjustably attached to an armature 96 through a link 97 and a screw piece 98. The armature is actuated downward by a solenoid 99 which, as illustrated in Figs. 2 and 3, is rigidly mounted in the upper portion of the casing 9, but the armature is normally held up in the position illustrated in Fig. 6 by the spring 85 of the controlling valve, reinforced by air pressure when the system is charged. While thus shown as an integral part of the engineer's brake head, it is evident that this controlling valve with its magnet control can constitute a separate piece of apparatus, and also that it can be arranged to operate on a closed instead of an open circuit method.

The solenoid 99 is connected as at terminals 106, 106' (Fig. 3) with an electric circuit, shown in the upper right hand corner of Fig. 1. This circuit is normally opened at contact 463 when the armature 452 is retracted from that contact by its spring. The armature 452 is pivotally mounted, and is integral with an oppositely disposed contact member which normally closes a shunt at contact 451.

The armature 452 is so disposed as to be constantly in the field of a coil 433, and to pass, when the vehicle is in motion, into the field of electromagnets 320 on the track. The coil 433 is in a closed circuit with the battery 420 through hand switch 497, pivot of armature 452 and a signal lamp. When the apparatus is in normal condition a part of the operative current to coil 433 is by-passed through the contact 451, and the coil 433 is at such time ineffective to attract its armature 452.

The track magnets 320 are controlled by the traffic conditions ahead by suitable relays, through the wayside signals, or by any other suitable means, so that current is supplied thereto and the magnets excited when a caution or danger condition exists.

When a vehicle equipped with my apparatus moving in the direction of the arrow shown in Fig. 1, passes an excited track magnet 320 the armature 452 meets resistance to its forward movement, and is pulled back, breaking the contact 451 of the shunt around coil 433, with the resultant increased energization of coil 433, and the closure of contact 463 in the circuit of the coil 99.

The armature 452 when once attracted to the coil 433 is held in the position making contact 463 until such time as the circuit is broken through the manual opening of switch 497. It is obvious that if on passing an energized track magnet 320, the switch 497 is held open by the engineer, the movement of the armature 452 is without effect upon the automatic brake applying apparatus as the circuit of the coil 99 is then broken at switch 497.

Thus the engineer, by acknowledging the wayside signal by the movement of the switch 497 to its open position, may forestall the automatic brake application. If however, an impulse is received from an active magnet 320 prior to the manual opening of the switch 497, the coil 99 is energized, the valve 80 put in power supplying condition, the engineer's valve thrown to lap position, and the pilot valve 119 opened to cause a reduction of pressure in the equalizing reservoir and equalization piston chamber, and thus to apply the brakes. If thereafter the engineer moves the switch 497 to open position, while the circuit of the coil 99 is broken, and air is exhausted from behind the pistons 69 and 69', no change is effected in the condition of the engineer's valve nor in the pilot valve 119. Thus it is seen that while the switch 497 constitutes a forestalling means, and while it operates to reset the electrical apparatus, it does not operate to remove a braking once initiated by the movement of the armature 452 on passing a live track magnet.

When the solenoid 99 is energized its armature is drawn down and the controlling valve 80 moved from inert free air (upper position) to active power supply (lower position) and is so maintained until the solenoid is de-energized when it returns to normal position and raises the armature as above described.

The parts 101, 102, 103, 104, 105, 105', 110, 111, 112, 113, 113', 115, 116 and 185 shown in the drawings have to do with inventions described and claimed in my original application, but form no part of the invention of this divisional application. They are therefore not described or claimed herein and may be disregarded.

In addition to the function of the driving yoek 71 above described, it has the further function of opening a pilot valve to atmosphere causing a reduction of pressure in the equalizing chamber and equalizing reservoir. This pilot valve 119, which is illustrated as a suitably faced spring closed poppet valve seats against its head 120, which is adjustably secured into the upper portion of the casing 9 adjacent to the stationary portion of the stops 74, 74' to permit regulation of the extent of valve opening. Its stem 121 passes through a guiding aperture at its head, and to assure a free passage of air when the valve is opened, is flattened on three sides as indicated at 122, 122. It is in the line of forward travel of a lug 123 carried on the driving yoke 71, by which means the pilot valve is opened. In this connection the stop 74, 74' has the additional function to that above mentioned of preventing the jamming of the pilot valve head 120 by receiving the thrust from the driving yoke 71. (See Figs. 4 and 5.) The chamber of the pilot valve connects with the equalizing reservoir and equalizing piston chamber 19 by pipes 124, 154 and 32 and is illustrated as so connected through an additional part 177, which as above set forth may be disregarded for the purposes of this divisional application, pipes 124 and 154 being assumed as in direct communication with each other.

The pilot valve 119 is so positioned and adjusted that when the driving yoke completes the movement of the rotary valve to lap position, it opens the pilot valve the desired amount to effect the operation of the equalizing piston 21 through reduction of air pressure above it, so that any appreciable clockwise movement of the driving yoke from its then position, as for example when the engineer's handle is moved from lap position toward running or release position, permits the valve to close instantly under its own pressure.

Considering the operation of the engineer's automatic valve head, in Fig. 3 where all the parts are shown in running position, the pins 72, 72' of the driving yoke are shown out of contact with the radial arms of the driving yoke 73. If the engineer's handle is moved clockwise to release position these radial arms will engage the pins of the driving yoke; so the latter will be thrown clockwise, if not already in their extreme position of that movement. This position is shown in Fig. 3 where the pistons 69, 69' are in their rearward position, in readiness for a pneumatic drive. Due to the single direction drive, the pistons and driving yoke are not moved by counter-clockwise motion of the brake handle. Therefore, when the parts of the engineer's automatic valve head are free from automatic action, the engineer has the entire sweep of his sector, and can with perfect freedom and without interference manipulate his brake handle and apply and release his brakes in the ordinary manner.

Automatic application of the brakes is normally initiated when the parts are in the position shown in Fig. 3, that is with the engineer's valve in running position. Assuming the parts in that position, if the circuit to the solenoid 99 is closed, as is the case when and at the time the armature 452 is moved past an active track magnet 320, with switch 497 closed and the brakes are to be automatically applied, the armature 96 will be drawn downward into the solenoid and place the controlling valve 80 in its power supplying position by means of the operating arm 95; pressure air will then be admitted through the controlling valve, as above described, into the motor cylinders 68, 68', and will thrust the pistons outward and rotate the driving yoke 71 counterclockwise. The pins 72, 72' on the driving yoke will then engage and rotate the radial arms of the driven yoke, which in turn will move the rotary valve to lap position, and finally the driving yoke at the limit of its motion will open the normally closed pilot valve 119. The opening of the pilot valve in turn automatically effects the application of the brakes by reducing pressure in equalizing reservoir and equalizing piston chamber.

The motion of the engineer's handle and rotary valve is opposed by two forces, one, the friction and compression of the spring tongue in the engineer's handle on the notch sector 62, which may be considered about the same whatever the air pressure, and the other the friction of the rotary valve on its face, and of the rotary valve spindle against its air seat; which friction will vary about directly as the air pressure. These forces are to be taken into consideration in adjusting the throttling valve 90, the adjustment of which should be such that while the rotary valve is automatically moved to lap position, it is not done so with such a speed that its momentum carries it beyond that position.

When the solenoid circuit is deenergized the armature 96 is relieved from magnetic pull and is raised to its free position by the controlling valve 80, which then cuts off pressure air from the motor cylinders and opens them to atmosphere in the manner above described, but this causes no movement of the rotary valve from its then lap position, and consequently the brakes once automatically applied are held so until manually released by the engineer's brake handle being moved ordinarily into release position. This not only releases the brakes, but restores the motor pistons and driving yoke to the position illustrated in Fig. 3 in readiness for a second automatic application.

During automatic braking, the rotary valve is capable of manual movement to either extreme position of its sector, its movement toward release position being opposed and hindered by the pressure in the motor cylinders 68, 68', while perfect freedom is given such movement to a further brake applying position.

The term vehicle is used herein as designating not only a single vehicle but a plurality of them when assembled in a train.

The foregoing detailed description has been given for clearness of understanding, and no undue limitation should be deduced therefrom, but the appended claims should be construed as broadly as permissible in view of the prior art.

Having thus described my invention, what I claim and desire to secure by Letters Patent is:—

1. The combination with a track and a vehicle moving thereon, of a brake system including an engineer's valve, and means located along the track and upon the vehicle for placing the engineer's valve in lap position and at the same time effecting a reduction of air pressure in the brake system.

2. The combination with a track and a vehicle moving thereon, of a brake system including an engineer's valve having manual movement to extreme positions, and means located along the track and upon the vehicle for placing the engineer's valve in an intermediate position and at the same time effecting a reduction of pressure in the brake system, said means being ineffective to place said valve in any other position.

3. The combination with a track and a vehicle moving thereon, of a brake system including an engineer's valve having manual movement to charging and a plurality of non-charging positions, some of which are braking positions, and means located along the track and upon the vehicle for placing the engineer's valve in an intermediate non-charging position from which it may be manually moved to a further noncharging position and at the same time effecting a reduction of pressure in the brake system.

4. The combination with a track and a vehicle moving thereon, of a brake system including an engineer's valve having manual movement to extreme positions, and means located along the track and upon the vehicle for placing the engineer's valve in an intermediate position and at the same time effecting a reduction of pressure in the brake system and means for forestalling the effective operation of said last-named means.

5. In a train brake system, the combination with an engineer's valve and a brake pipe, of means for throwing such valve to lap position and permitting escape of air from the brake pipe.

6. In a train brake system, the combination with a brake pipe, an engineer's valve and means for manually moving the same, of means for automatically placing the engineer's valve only in an intermediate noncharging position and for permitting the escape of air from the brake pipe.

7. In a train brake system, the combination with an engineer's valve and a brake pipe, of a valve for permitting escape of air from the brake pipe, and means for opening the escape valve and moving the engineer's valve to lap position.

8. In a train brake system, the combination with a brake pipe, an engineer's rotary valve and means for manually moving the same between extreme positions, of a valve permitting escape of air from the brake pipe, and means actuated from the track for automatically moving the engineer's rotary valve to an intermediate noncharging position and opening the escape valve, said means being ineffective to move the engineer's rotary valve to any other position.

9. In a train brake system, the combination with an engineer's valve and a brake pipe, of a valve for permitting escape of air from the brake pipe, means for throwing the engineer's valve to lap position without actuation of the escape valve, and means for throwing the engineer's valve to lap position with actuation of the escape valve.

10. The combination with an engineer's valve having manual movement to charging, lap, and braking positions, of mechanically operated means for moving such valve to lap position and retaining it there independent of manual movement of the valve to such position.

11. The combination with an engineer's valve having manual movement to extremes of charging and non-charging positions, of mechanically operated means for moving such valve to an intermediate non-charging position and retaining it there independent of manual movement to such position.

12. The combination with an engineer's valve having manual movement to charging, lap, and braking positions, of mechanically operated means for moving such valve to lap position and retaining it there independent of manual movement of the valve to such position but subject to manual movement of the valve to other positions.

13. An engineer's valve having manual movement between extreme positions, in combination with pneumatic means electrically controlled and operable for moving such valve to an intermediate position only.

14. An engineer's valve having manual movement to charging, lap, and braking positions, in combination with pneumatic means operable only for moving such valve from a charging position to lap position.

15. An engineer's valve having manual movement to charging positions and a plurality of non-charging positions, in combination with pneumatic means operable for moving such valve only from a charging position to an intermediate non-charging position.

16. An engineer's valve having manual movement to charging, lap, and braking positions, in combination with means subject to control by the engineer in manual movement of the valve to a charging position and operable only for moving such valve from a charging to a lap position.

17. An engineer's valve having manual movement to a charging position and a plurality of non-charging positions, in combination with means subject to control by the engineer in manual movement of the valve to a charging position and operable only for moving such valve from a charging position to an intermediate non-charging position.

18. An engineer's valve having manual movement to charging, lap, and braking positions, in combination with means subject to control by the engineer in manual move- ment of the valve to a charging position and operable only for moving such valve from a charging to a lap position while leaving it free for manual movement to a braking position.

19. An engineer's valve having manual movement to a charging position and a plurality of non-charging positions, certain of the last named positions at least being braking positions, in combination with means subject to control by the engineer in manual movement of the valve to a charging position and operable only to move said valve from a charging position to an intermediate non-charging position, while leaving said valve free for manual movement to a further non-charging and braking position.

20. An engineer's valve having manual movement to a charging position and a plurality of non-charging positions certain of which at least are braking positions, in combination with means operable only for moving such valve from a charging to a non-charging position, while leaving it free for manual movement to a further non-charging position which is a braking position.

21. An engineer's valve having manual movement to a charging and a plurality of non-charging positions, in combination with means operable only for moving such valve from a charging to a non-charging position, while leaving it free for manual movement to another non-charging position.

22. In a train brake system, the combination with an engineer's valve having manual movement to charging, lap, and braking positions, of mechanically operated means operable only for moving such valve from charging to lap position, and means actuated by such last named movement of the valve to lap position for effecting a brake application.

23. In a train brake system, the combination with an engineer's valve having manual movement to charging and non-charging positions, of mechanically operated means operable only for moving such valve from a charging to a non-charging position, and for initiating a brake application, said last named means being ineffective to prevent the manual movement of the engineer's valve to a further non-charging position.

24. In a train brake system, the combination with an engineer's valve having manual movement to charging, lap, and braking positions, of mechanically operated means operable only for moving such valve from a charging to lap position, and means controlled by the first named means for effecting a brake application.

25. In a train brake system, the combination with an engineer's valve having manual movement to charging, lap, and braking positions, of means subject to control by the engineer in manual movement of the valve to a charging position and operable only for moving such valve from a charging position to lap position while leaving it free for manual movement to a braking position, and means controlled by the first named means for effecting a brake application.

26. In a train brake system, the combination with a brake pipe, an engineer's rotary valve and service exhaust valve operated thereby for permitting escape of air from the brake pipe system, of a supplemental valve for initiating the escape of air from the brake pipe system, means for manually shifting the engineer's rotary valve to a non-charging position, means for automatically throwing the engineer's rotary valve to the same non-charging position, and means for actuating the supplemental valve.

27. In a train brake system, the combination with an engineer's valve having a service exhaust port and a manually controlled pilot exhaust port for effecting the operation of the service exhaust port, of a pilot exhaust port automatically opened to effect the operation of the service exhaust port and means for automatically opening said last named pilot exhaust port.

28. In a brake control system, in combination with an engineer's valve having charging and non-charging positions and an exhaust port controlled by an equalizing piston, manually controlled means for exhausting air from one side of said piston to effect an opening of the exhaust port, automatic means for exhausting air from the same side of said equalizing piston and means for actuating said automatic means including a unidirectional driving member adapted when operated to place the engineer's valve in an intermediate non-charging position.

29. In a train brake system, the combination with an engineer's valve having an exhaust port, of a pilot exhaust port which when opened effects an opening of the first named exhaust port, means for manually moving the engineer's valve to open the first named exhaust port, and means for automatically moving the engineer's valve on the occurrence of a danger condition to open the pilot exhaust port and thereby effect an opening of the first named exhaust port.

30. In a train brake system, the combination with an engineer's valve having an exhaust port, of a pilot exhaust port which when opened effects an opening of the first named exhaust port, means for manually moving the engineer's valve to open the first named exhaust port, and electrically controlled pneumatically actuated means for moving the engineer's valve on the occurrence of a danger condition to open the pilot exhaust port and thereby effect an opening of the first named exhaust port.

31. In a train control system, the combination of a brake pipe and an engineer's valve having manual movement to charging and a plurality of non-charging positions, means for mechanically moving said engineer's valve to an intermediate non-charging position and for reducing the pressure in the brake pipe, a coil for initiating when in one electrical condition the operation of said means, cooperating inductive means on the train and along the track for causing changes in the electrical condition of said coil, and means acting when operated at the time of the joint action of the said cooperating means for nullifying such action and preventing a change in the electrical condition of said coil.

32. In a train control system, the combination of an engineer's valve having manual movement to extreme positions, means for mechanically moving said valve only to an intermediate position while permitting free manual movement thereof in the same direction to a further position, and cooperating means on the track and on the train for initiating the operation of said means.

33. In a train control system in combination with a brake pipe and an engineer's brake valve, manually operated means for moving said valve between extreme positions, pneumatically operated means for moving said valve only to an intermediate position and for causing a reduction of pressure in the brake pipe, a valve for actuating said pneumatic means, a coil for controlling said valve, a coil for controlling the circuit of said first named coil, cooperating means upon the train and upon the track controlling the condition of said last named coil, and manually operable means for restoring said coils to their normal condition.

34. An engineer's valve having manual movement between extreme position, in combination with automatic brake applying means including means operable only for moving such valve to an intermediate position.

35. An engineer's valve having manual movement to charging, lap, and braking positions, in combination with automatic brake applying means including means operable only for moving such valve from a charging position to lap position.

36. An engineer's valve having manual movement to charging position and a plurality of noncharging positions, in combination with automatic brake applying means including means operable for moving such valve only from a charging position to an intermediate noncharging position.

37. In a train brake system, the combination with a brake pipe, an engineer's valve and means for manually moving the same, of means for automatically placing the engineer's valve only in an intermediate noncharging position and for permitting the escape of air from the brake pipe, and other manually operable means for forestalling the operation of the last-named means.

38. In a train brake system, the combination with a brake pipe, an engineer's valve and means for manually moving the same, of means for automatically placing the engineer's valve only in an intermediate noncharging position and for permitting the escape of air from the brake pipe, said means including an electrical device effective on change of electrical condition to cause the operation of said means, and manually operable means for resetting said electrical device.

39. In a brake control system, in combination with an engineer's valve having charging and noncharging positions and an exhaust port controlled by an equalizing piston, manually controlled means for exhausting air from one side of said piston to effect an opening of the exhaust port, automatic means for exhausting air from the same side of said equalizing piston, means for actuating said automatic means including a unidirectional driving member adapted when operated to place the engineer's valve in an intermediate noncharging position, and manually operable means for forestalling the operation of said automatic means.

Signed at New York, N. Y., this 29th day of September, 1925.

FRANK J. SPRAGUE.